J. B. STRAUSS.
DEVICE FOR STOPPING HIGH POWER VEHICLES.
APPLICATION FILED AUG. 25, 1919.
1,332,237.
Patented Mar. 2, 1920.
3 SHEETS—SHEET 3.
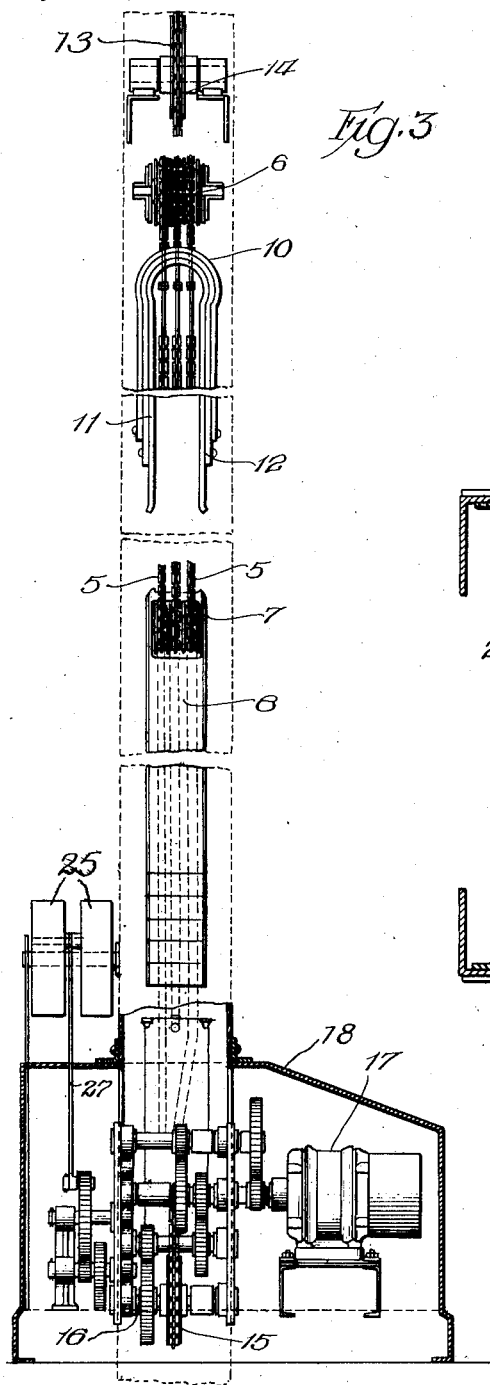
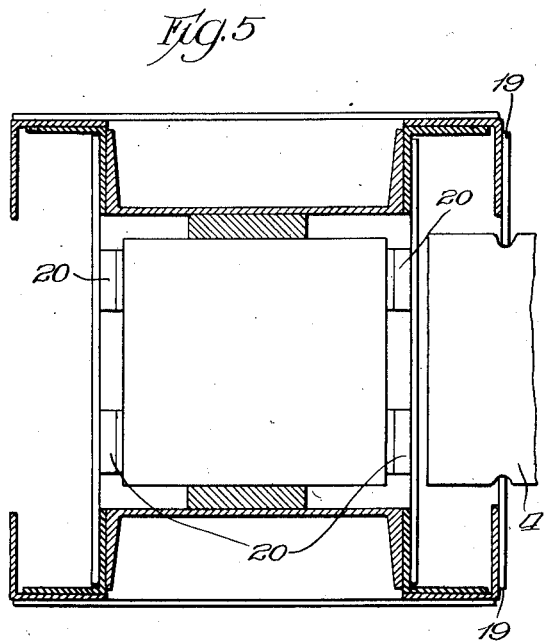
Inventor:
Joseph B. Strauss
By Parker & Carter Attys

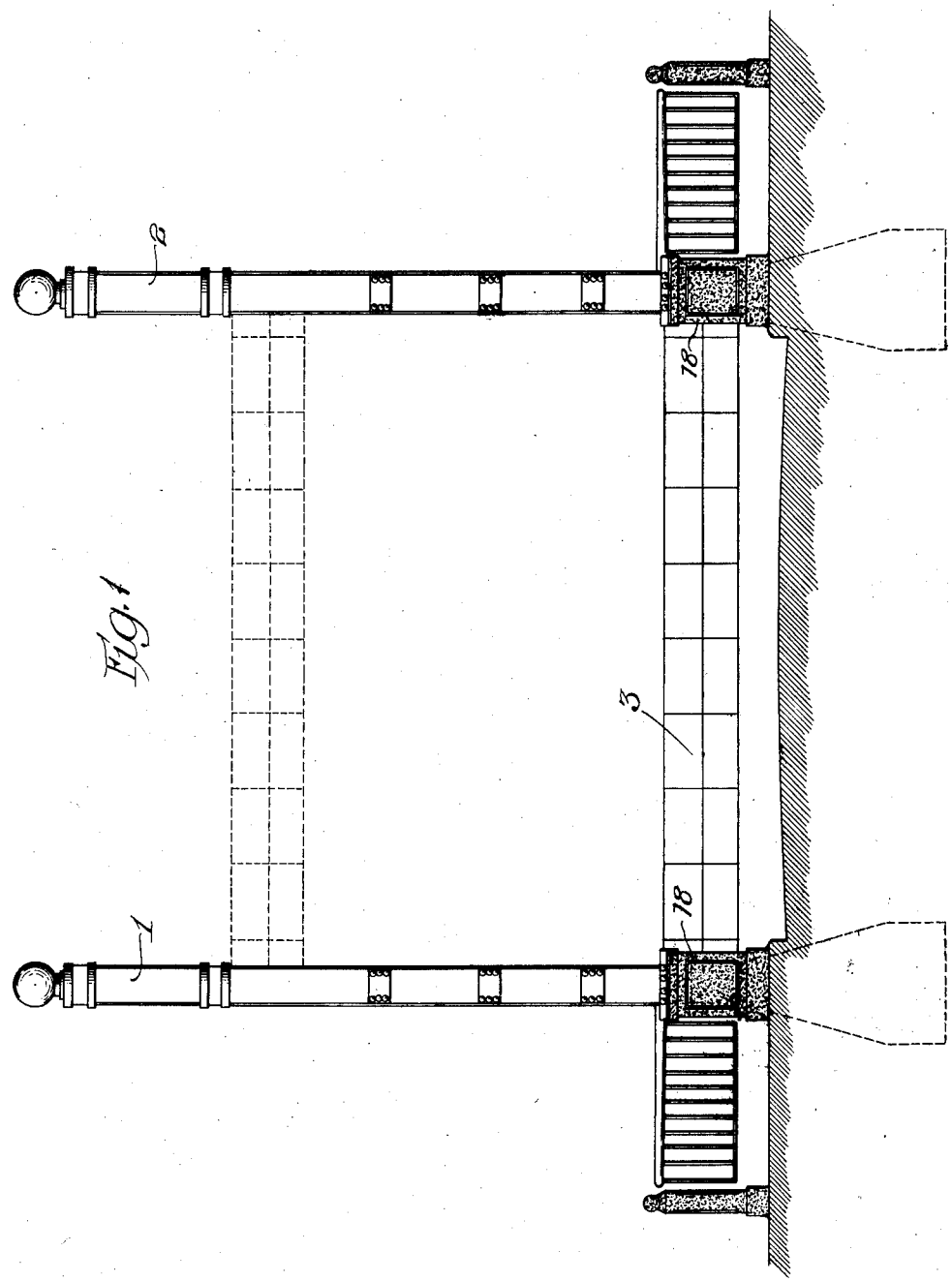

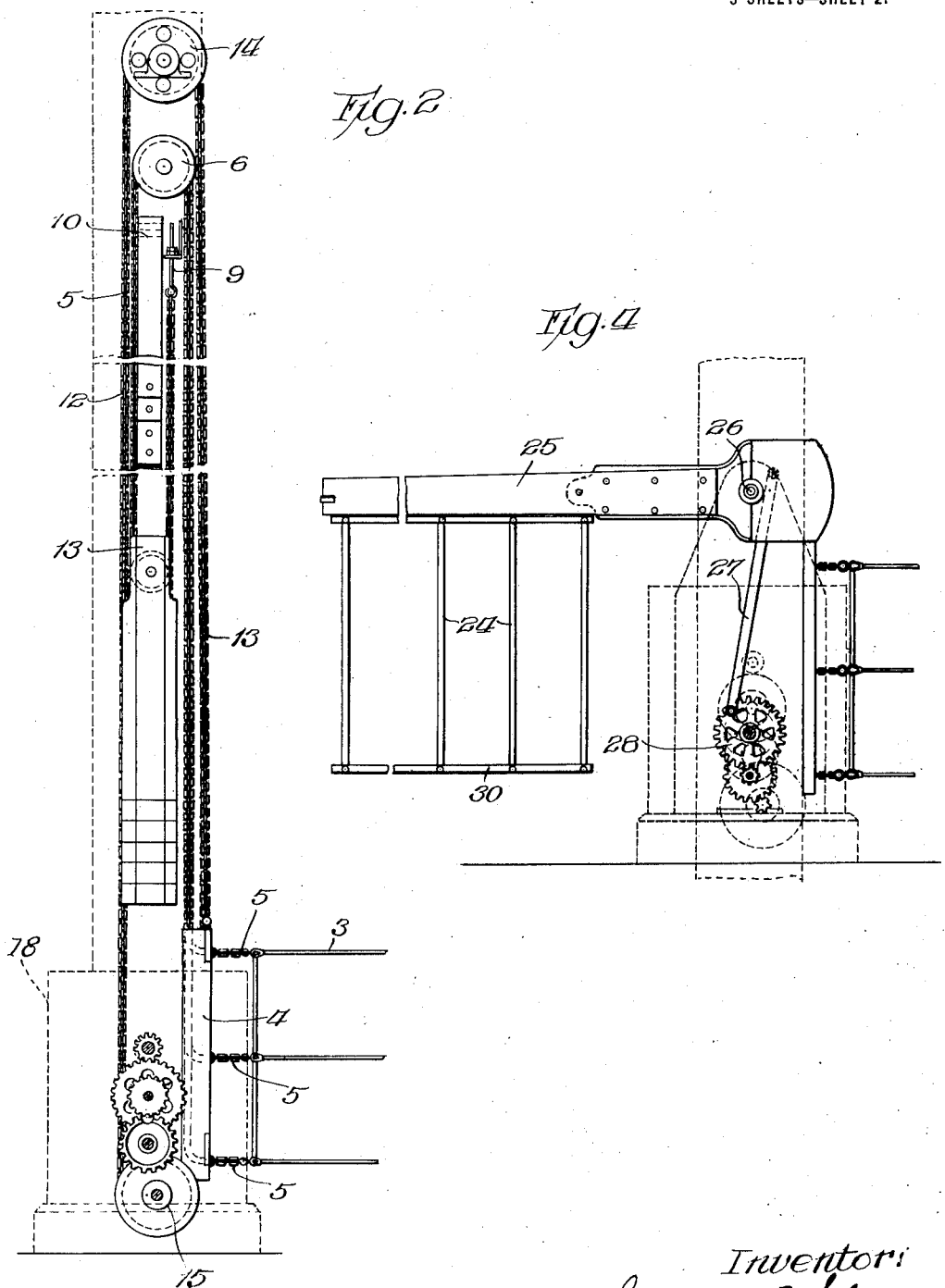

UNITED STATES PATENT OFFICE.

JOSEPH B. STRAUSS, OF CHICAGO, ILLINOIS.

DEVICE FOR STOPPING HIGH-POWER VEHICLES.

1,332,237.   Specification of Letters Patent.   Patented Mar. 2, 1920.

Application filed August 25, 1919. Serial No. 319,655.

*To all whom it may concern:*

Be it known that I, JOSEPH B. STRAUSS, a citizen of the United States, residing at Chicago, in the county of Cook and State of Illinois, have invented a certain new and useful Improvement in Devices for Stopping High-Power Vehicles, of which the following is a specification.

This invention relates to improvements in devices for stopping high power vehicles at points where such vehicles and the occupants thereof are liable to be injured unless stopped. The device is particularly adapted to be used at points where bridges are opened at intervals and at railway crossings and the like. The invention has among other objects to gradually stop high power vehicles such as automobiles, independent of the driver and at times when it is desirable to stop them, and to do this without causing injury to the vehicle or to the occupants.

A high powered street vehicle such as a heavy automobile when moving along at considerable speed has a great momentum and it is difficult to provide a safe and secure means for automatically, gradually stopping it. Such a device must have the ability to resist the impact, the ability to stand the great strains placed upon it, and to move forward in such a way as to permit the vehicle to continue traveling for a while so as to prevent sudden stopping and to finally stop the vehicle without turning it over, injuring it, or injuring the occupants. The present invention has among other objects to provide a device having all these characteristics and which will perform this function in a satisfactory manner.

The invention has other objects which are more fully set out in the following description and explanation. Referring now to the accompanying drawings—

Figure 1 is a general view illustrating one form of a device embodying the invention;

Fig. 2 is an enlarged view showing the mechanism associated with one of the posts at the side of the roadway, the motor being removed;

Fig. 3 is a view similar to that of Fig. 2 as seen from the side;

Fig. 4 is a view showing the obstruction for the sidewalk;

Fig. 5 is a cross section of one form of support.

Like numerals refer to like parts throughout the several figures.

Referring now to the accompanying drawings I provide two fixed supports 1 and 2, one on each side of the roadway along which the vehicle to be stopped passes. An impact receiving part 3 is arranged so that it may be ordinarily out of the way when not being used as shown in dotted lines in Fig. 1. The impact receiving device is lowered as shown in full lines in Fig. 1 when it is desired to stop the vehicle. This impact receiving device is of any desired construction and must be arranged so that it will move when struck by the vehicle and present a retarding resistance to the movement of the vehicle so as to gradually stop it. In the particular construction illustrated the impact receiving device is shown as consisting of flexible pieces or cables formed into a suitable member associated with the fixed supports at each side of the roadway, or suitable mechanisms, preferably duplicates for controlling and paying out the impact receiving part. Associated with each support is a spacer 4 provided with suitable openings or the like through which the flexible reserve portions pass which are connected with the impact receiving device and which permit it to move when struck by the vehicle. These flexible reserve portions may be made of cable, chain or any other suitable material, and are arranged so that when the impact receiving device is struck, portions thereof will pass through the spacer at each side of the roadway and permit the impact receiving device to move forward a sufficient distance while it is being stopped. Associated with the fixed supports are suitable retarding mechanisms for retarding or resisting the movement or paying out of the reserve flexible parts 5.

In the construction illustrated I provide a weight and also a friction device. In this construction the reserve flexible portions 5 pass up, preferably on the inside of the supports, and pass over pulleys or direction changing devices 6 (see Figs. 2 and 3). The reserve portions 5 then pass over pulleys or direction changing devices 7 attached to the weight 8, and their ends are then connected with the holding parts 9 (see Fig. 2) which are attached to the supports in any desired manner. The supports are of sufficient height and the parts are sufficiently arranged so as to give the proper length of the reserve flexible portions 5. Associated with the weight so as to coöperate with it to produce a resistance to the paying out of the flexible reserve portions 5, is a suitable friction device 10 held in position in any desired manner as by being fastened to the support. As herein shown this friction device consists of opposed members 11 and 12 between which the weight 8, or a portion thereof, or a part associated therewith is received toward the latter part of the movement of the weight, the opposed members 11 and 12 clamping the weight and offering an increased resistance to its movement. These opposed members may be of metal, and are preferably arranged so as to have a clamping action upon the weight, this clamping action preferably increasing as the weight passes up into the space between them. The parts are preferably arranged so that when the weight is moved up between the opposed members 11 and 12 by the vehicle striking the impact receiving part, the weight will release itself after the pressure is removed and moved back to its initial position.

The spacers 4 are arranged so that they may be moved upwardly to move the impact receiving device out of the way, and so that they may be moved downwardly to move the impact receiving device to its operative position, and will be held in this position when the impact receiving device is struck by the vehicle. In the construction shown each spacer 4 is connected in an endless flexible controlling device 13 which passes over a pulley or direction changing device 14 near the top of the support and then passes down and is connected with a suitable operating mechanism. As herein shown this flexible controlling device passes over a driving wheel 15 on a shaft 16, which shaft is connected to a motor of any suitable description. In the construction illustrated this motor is an electric motor and is connected with the shaft 16 by suitable speed reducing gears so as to secure the proper speed of travel. These speed reducing gears and the motor act to hold the spacers in their down position or up position or in any intermediate position. The motor is located in a housing 18 at the bottom of the support. The spacer 4 is provided with suitable guides so that it will be properly guided in its upward and downward movement. Any suitable construction for this purpose may be used. As illustrated in Fig. 5 which shows a cross section of one form of support, there are guides 19 which work in grooves in the spacer. I may also provide guides 20 inside the support for the weight, the weight or some part associated therewith having parts which engage these guides and slide therealong as the weight is moved up and down. When the device is used where there are foot passengers, there is also proper obstruction across the sidewalk for foot passageway, and this must also be arranged so as to be moved to and from its operative position. I have shown one construction for this purpose in Fig. 4 wherein there is an obstruction 24 connected with an arm 25 pivoted to the support at 26 and having an arm 27 which connects with the operating mechanism which in this instance is shown as a wheel or crank 28 operatively connected with the motor 17. The arrangement is such that when the motor is moved to move the impact receiving part to its inoperative position, the arm 25 and the obstruction 24 will also be moved to their inoperative position.

The two supports are preferably similar and have similar mechanism associated therewith so that when the impact receiving part is struck it is free to move at the two ends so that the vehicle will continue to move in substantially the same direction in which it is traveling until it is gradually stopped. Without this construction the vehicle would be turned to one side and would be liable to be turned over and injured and the occupants would also be liable to be injured.

It will be noted that there is provided a retarding device wherein there is a primary retarding mechanism at each end of the impact receiving part permitting quick retarding movement thereof and a secondary retarding movement at each end of said impact receiving part acting in conjunction with the primary mechanism to slacken and stop said retarding movement, the entire device gradually stopping the vehicle which strikes the impact receiving part. In the embodiment of my invention illustrated in the drawings I have shown one relation between the primary and secondary mechanism but any other desired relation may be used which will bring about the gradual stopping of the vehicle. The secondary retarding mechanism may be of a different construction from the primary retarding mechanism.

The retarding force is preferably exerted axially on a flexible device extending axially on the interior of each support.

I have described in detail a particular construction embodying the invention, but it is of course evident that the parts may be varied in many particulars without departing from the spirit of the invention as set forth in the claims hereto appended, and I therefore do not limit myself to the particular construction illustrated.

The motor and gearing and the housing containing them are substantially in line with the supports and act as braces for these supports to resist the force due to the vehicle striking the impact receiving part.

The guides for the spacers are preferably removably attached to the supports so that they may be removed to better facilitate access to the apparatus inside the support.

The use and operation of my invention are as follows:

When the device is not in use the impact receiving part is moved up near the top of the supports as shown in dotted lines in Fig. 1. When it is desired to stop a vehicle the motor is operated so as to move the spacers and impact receiving device down across the roadway as shown in full lines in Fig. 1. If now a high power vehicle, such as a heavy and powerful automobile comes along and fails to stop it strikes the impact receiving part. The impact receiving part is then moved practically equally at both ends, the reserve portions 5 paying out to permit this. This movement lifts the weights 8 and resists the forward movement of the vehicle, tending to slow it down. After the vehicle is moved a certain distance the weight passes between the members 11 and 12 of the friction device and the resistance to the forward movement of the vehicle is greatly increased, and gradually brings it to a stop. It will thus be seen that by means of this device a practical commercial construction for automatically stopping high speed street vehicles is provided, and a device which will stop the vehicles without turning them over or otherwise injuring them, the device having the strength and the elasticity and the resistance to permit the vehicle to move forward and yet to be gradually and safely stopped.

After the vehicle has been stopped it may be moved back and the impact receiving part will then be moved back to its initial position. When it is desired to move it out of the way it is moved to its inoperative position as shown in dotted lines in Fig. 1.

In the particular construction shown it will be noted that the parts are arranged so that when the impact receiving part is struck by a vehicle the vehicle and the part of the impact receiving part struck thereby moves a greater distance in a given interval of time than the points of connection between the retarding devices and the flexible devices extending along the supports.

I claim:

1. A device for gradually stopping vehicles comprising an impact receiving part adapted to be brought into operative position across the roadway, a primary retarding mechanism at each end of said impact receiving part permitting quick retarding movement thereof, and a secondary retarding mechanism at each end of said impact receiving part acting in conjunction with the primary mechanism to slacken and stop said retarding movement.

2. A device for gradually stopping vehicles comprising a support on each side of the road-way, an impact receiving part adapted to be brought into operative position between said supports, a retarding device associated with each support, and comprising a primary retarding mechanism at each end of said impact receiving part permitting quick retarding movement thereof, and a secondary retarding mechanism at each end of said impact receiving part exerting an increased resistance to the movement of said impact receiving part during the latter part of its movement when struck by a vehicle so as to slacken and stop it.

3. A device for gradually stopping vehicles comprising two upright supports, one on each side of the roadway, an impact receiving part extending across the roadway between said supports, a flexible device connected with each end of said impact receiving part and extending axially along the interior of said supports, and a retarding mechanism for each of said flexible devices, said retarding mechanisms exerting retarding forces on said flexible devices axially of said supports.

4. A barrier for road-ways comprising a continuous yielding part extending across the road-way space to be protected, and an unyielding part across the foot walk and means for simultaneously moving the yielding and unyielding parts into their operative positions.

5. A device for gradually stopping high power street vehicles comprising two supports one on each side of the roadway, an impact receiving part above adapted to be brought into operative position across the roadway, said impact receiving part movably connected at both ends with the supports, two sets of retarding mechanisms for said impact receiving part, one set associated with each support and adapted to gradually retard the movement of the impact receiving device along the roadway when struck by a high power vehicle and bring it to rest, flexible connections between said impact receiving part and said retarding mechanisms, said retarding mechanism acting simultaneously on both ends of the impact receiving part so that said impact receiving part moves along with the vehicle whereby the high power vehicle striking the impact receiving part will continue to move in substantially the same direction in which it is traveling and will be gradually stopped, and means for moving said impact receiving part to an inoperative position when not in use consisting of mechanism separate from the retarding mechanism, and a motor associated with each support for operating said mechanism.

6. A device for gradually stopping high power street vehicles comprising two fixed supports, one on each side of the roadway, a flexible impact receiving part above adapted to be moved into operative position across the roadway and comprising a plurality of flexible parts, two sets of retarding mechanisms for said impact receiving part, one set associated with each fixed support, a plurality of flexible connections connecting said impact receiving part with said retarding mechanisms, a spacer associated with each fixed support, and provided with openings through which said flexible connections freely run, means for holding said spacers against movement when the impact receiving part is in its operative position, and moving mechanism for moving said spacers and the impact receiving part to an inoperative position above the roadway.

7. A device for gradually stopping high power street vehicles comprising two fixed supports, one on each side of the roadway, a flexible impact receiving part above adapted to be moved into operative position across the roadway, and comprising a plurality of flexible parts, two sets of retarding mechanisms for said impact receiving part, one set associated with each fixed support, a plurality of flexible connections connecting said impact receiving part with said retarding mechanisms, a spacer associated with each fixed support and provided with openings through which said flexible connections freely run, each spacer provided with a controlling device comprising a flexible power transmitting device connected with each end thereof, and a driving mechanism for said power transmitting device adapted to move it so as to lift and lower each of said spacers to move the impact receiving part to its inoperative and operative positions.

8. A device for gradually stopping high power street vehicles comprising two supports one on each side of the roadway, an impact receiving part adapted to be brought into operative position across the roadway, a weight associated with each support, a flexible connection extending between each weight and one end of said impact receiving part, and a friction resisting device formed in part by said weight and brought into action by the movement of the weight as the impact receiving part is moved when struck by a vehicle, said weight and friction resisting device coöperating to retard the movement of the impact receiving part, and bring the vehicle gradually to rest.

9. A device for gradually stopping high power street vehicles comprising two supports one on each side of the roadway, an impact receiving part adapted to be brought into operative position across the roadway, a retarding mechanism associated with each support, said retarding mechanisms connected with said impact receiving part so as to retard its movement when it is struck by a vehicle, each of said retarding mechanisms comprising a retarding weight, and a friction device, means for causing the retarding weight to act during the first part of the movement of the impact receiving part and the friction device to act during the latter part of the movement.

10. A device for gradually stopping high power street vehicles comprising two supports one on each side of the roadway, an impact receiving part adapted to be brought into operative position across the roadway, a retarding mechanism associated with each support, said retarding mechanisms connected with said impact receiving part so as to retard its movement when it is struck by a vehicle, each of said retarding mechanisms comprising a retarding weight and a friction device, said friction device comprising separated members between which the weight is received, a connection between said weight and the impact receiving part, the weight arranged so that when moved a predetermined distance by the movement of said impact receiving part, said weight passes between the separated parts of the friction device so as to bring the friction device into operation to assist in retarding the movement of the impact receiving part.

11. A device for gradually stopping high power street vehicles comprising a movable impact receiving device which when in its operative position is in the path of the moving vehicle, mechanism for retarding the movement of the impact receiving device when struck by the vehicle comprising a primary quick acting retarding device acting alone during the first part of the movement, and a differently constructed secondary retarding device acting during the latter part of the movement of said impact receiving device.

12. A device for gradually stopping high power street vehicles comprising a movable impact receiving device which when in its operative position is in the path of the moving vehicle, two varieties of retarding devices for retarding the movement of the impact receiving device when struck by the vehicle, one variety of retarding device acting alone during the first part of the movement, both varieties of retarding devices acting together during the latter part of the movement, the action of the first mentioned variety of retarding device automatically bringing the other variety of retarding device into action after a predetermined period.

13. A device for gradually stopping high power street vehicles comprising a movable impact receiving device which when in its operative position is in the path of the moving vehicle, two varieties of retarding devices for retarding the movement of the impact receiving device when struck by the vehicle, one variety of retarding device acting alone during the first part of the movement, both varieties of retarding devices acting together during the latter part of the movement, one variety of retarding device being movable and the other variety being stationary.

14. A device for stopping high power street vehicles comprising a movable impact receiving part which when in its operative position is in the path of the moving vehicle, retarding mechanism for resisting the movement of said impact receiving part comprising means for applying a quickly yielding resistance to said impact receiving part during the first part of its movement when struck by the vehicle, and means for increasing this resistance toward the latter part of the movement of said impact receiving part so as to stop its movement.

15. A device for stopping high power street vehicles comprising two supports one on each side of the roadway, an impact receiving part in position to be struck by the vehicle, a spacer associated with each support and connected with said impact receiving part, said supports being open at the sides, guides connected with said supports along the open edges of said sides and engaging said spacers, said guides being removable.

16. A device for gradually stopping high power street vehicles comprising two supports one on each side of the roadway, an impact receiving part extending across the roadway, lifting and lowering mechanism connected with said impact receiving part by means of which it is lowered to an operative position and lifted to an inoperative position, a motor associated with each support, gearing connecting each motor with the lifting and lowering mechanism, a housing for the motor and gearing of each support, said housing and motor and gearing being substantially in line with the support and acting as a brace therefor to resist the force when the impact receiving part is struck by the vehicle.

17. A device for gradually stopping high power street vehicles comprising two supports one on each side of the roadway, an impact receiving part extending across the roadway, a retarding mechanism associated with each support for retarding the movement of the impact receiving part when struck by the vehicle, said retarding mechanism comprising a gradually acting friction device located near the top of the support.

18. A device for gradually stopping vehicles, comprising an impact receiving part arranged to extend across the roadway, a flexible device connected with each end of said impact receiving part, a support at each end of said impact receiving part along which said flexible parts extend, a retarding device connected with each flexible device for continuously applying a retarding force thereto when the impact receiving part is struck by a vehicle, the structure specified including means for permitting the portion of said impact receiving part engaged by the vehicle, to move a greater distance in a given interval of time than the points of connection between the retarding devices and said flexible devices.

In testimony whereof, I affix my signature in the presence of two witnesses, this 1st day of August, 1919.

JOSEPH B. STRAUSS.

Witnesses:
  A. F. CLARKE,
  J. W. COVERICK.